United States Patent
Appelbaum et al.

(10) Patent No.: US 8,707,336 B2
(45) Date of Patent: *Apr. 22, 2014

(54) DATA EVENT PROCESSING AND APPLICATION INTEGRATION IN A NETWORK

(75) Inventors: Michael S. Appelbaum, Arlington, VA (US); Jeffrey H. Garvett, Washington, DC (US)

(73) Assignee: Informatica Corporation, Redwood City, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/780,858

(22) Filed: May 14, 2010

(65) Prior Publication Data
US 2010/0223629 A1  Sep. 2, 2010

Related U.S. Application Data

(63) Continuation of application No. 10/421,878, filed on Apr. 24, 2003, now Pat. No. 7,774,791.

(60) Provisional application No. 60/374,834, filed on Apr. 24, 2002.

(51) Int. Cl.
*G06F 9/44* (2006.01)
*G06F 9/46* (2006.01)
*G06F 9/54* (2006.01)

(52) U.S. Cl.
CPC *G06F 9/54* (2013.01); *G06F 9/542* (2013.01); *G06F 8/20* (2013.01)
USPC ........................................... 719/318; 717/100

(58) Field of Classification Search
None
See application file for complete search history.

(56) References Cited

U.S. PATENT DOCUMENTS

| | | | |
|---|---|---|---|
| 5,870,605 A | 2/1999 | Bracho et al. | |
| 6,289,385 B1 | 9/2001 | Whipple et al. | |
| 6,353,851 B1 | 3/2002 | Anupam et al. | |
| 6,490,574 B1 | 12/2002 | Bennett et al. | |
| 6,564,246 B1 | 5/2003 | Varma et al. | |
| 6,941,465 B1* | 9/2005 | Palekar et al. | 726/1 |
| 7,020,869 B2 | 3/2006 | Abrari et al. | |
| 7,027,463 B2 | 4/2006 | Mathew et al. | |
| 7,290,278 B2 | 10/2007 | Cahill et al. | |
| 7,428,723 B2 | 9/2008 | Greene et al. | |
| 7,634,539 B2 | 12/2009 | Schwarz et al. | |
| 2002/0091533 A1* | 7/2002 | Ims et al. | 705/1 |

(Continued)

OTHER PUBLICATIONS

Friedman et al., "Problem Solving, Abstraction, and Design Using C++" 1997, second edition, pp. 168-169 and 196-199.*

(Continued)

*Primary Examiner* — Qing Wu
(74) *Attorney, Agent, or Firm* — Fenwick & West LLP

(57) ABSTRACT

A system, method and computer program product for providing data event processing and application integration is provided. The present invention provides a novel application integration and event processing server that creates unified and personalized applications on demand out of existing Web services, communications systems, legacy assets, and databases for several types of applications without invasive programming. The present invention also provides a novel XML-based open markup language that allows real-time composite applications (for execution on the server of the present invention) to be easily created and changed while minimizing low-level coding by using a set of pre-defined templates, thus saving the time and expense typically required to create similar solutions from scratch.

28 Claims, 9 Drawing Sheets

(56) References Cited

U.S. PATENT DOCUMENTS

| | | |
|---|---|---|
| 2004/0204906 A1 | 10/2004 | Lambert et al. |
| 2004/0250261 A1 | 12/2004 | Huibregtse |
| 2006/0150022 A1 | 7/2006 | Malik |
| 2009/0013043 A1 | 1/2009 | Tan |

OTHER PUBLICATIONS

Agent Logic, Inc., "FAQ," Feb. 11, 2006, three pages. [Online] [Retrieved Sep. 28, 2011] Retrieved from the Internet <URL:http://web.archive.org/web/20060211122241/http://agentlogic.com/products/frequently_asked_questions.php#7.>.

Agent Logic, Inc., "Solution Brief: Real-Time Alerting and Event Awareness: Enable Disparate Collection Management Processes with Real-time Alerts and Event Awareness," 2004, five pages.

Australian Government—IP Australia, Examiner's First Report, Australian Patent Application No. 2008256623, Apr. 27, 2012, 2 pages.

Patent Cooperation Treaty, International Preliminary Report on Patentability, International Patent Application No. PCT/US2008/065374, Dec. 1, 2009, 7 pages.

\* cited by examiner

DATA EVENT PROCESSING AND APPLICATION INTEGRATION IN A NETWORK

This application claims priority from U.S. patent application Ser. No. 10/421,878 filed on Apr. 24, 2003, now U.S. Pat. No. 7,774,791, entitled "System, Method, And Computer Program Product For Data Event Processing And Composite Applications," which claims priority upon U.S. Provisional Application Ser. No. 60/374,834, filed Apr. 24, 2002. The entirety of those applications are incorporated herein by reference.

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

This patent specification incorporates by reference the contents of the compact disc attached hereto in duplicate (Copy 1 and Copy 2). Each disc is labeled in accordance with Rule 1.53(e)(6). The date of creation of the files on the disc is Apr. 16, 2013. The computer code on the compact disc includes the content of the APPENDIX on pages 44-106 of the Specification as filed, and is in a file named DOCS-#2896972-v1-16773_US_Appendix_with_software_code. The size of the file is 312 KB. The contents of the compact disc submitted herewith in duplicate are hereby incorporated by reference in this application as though fully set forth herein.

BACKGROUND OF THE INVENTION

1. Field of the Invention

The present invention generally relates to business event processing and application integration, and more particularly to systems and methods for providing data event processing and application integration which exploit multiple, distributed sources.

2. Related Art

In today's technological climate, a business enterprise must often bring information together from multiple, distributed sources in order to accomplish certain tasks (e.g., information sharing and alerting, multi-source data processing, content management, etc.). Such distributed sources include Customer Resource Management (CRM) applications, various internal and external databases, various user application software, legacy systems and the like. Such users must normally access each system or source manually in a "one-by-one" fashion in order to achieve the desired tasks.

Finding the above-described situation unacceptably slow and painstaking, software developers are often challenged to write applications for such business enterprises in order to take advantage of these distributed resources.

Invariably, in such a technological climate, the software developers meet the above-described challenge by writing a custom piece of software to take advantage of the available distributed resources. The writing of such custom pieces of software can be labor intensive, have long development cycles and require significant low-level coding. Further, the resulting code often requires significant human operator review and handling of events that occur within or across the distributed systems or sources accessed by the code.

Therefore, given the above, what is needed is a system, method and computer program product for data event processing and application integration. The system, method and computer program product should enable applications to be assembled out of many existing systems in a short period of time, thus shortening information technology (IT) delivery cycles, improving customer satisfaction, and lowering operational costs.

SUMMARY OF THE INVENTION

The present invention meets the above-identified needs by providing a system, method and computer program product for providing data event processing and application integration. The present invention brings information together from multiple distributed sources, interacts with those sources on an automated basis, reacts to information based on pre-defined rules and allows real-time business processes to be rapidly built on top of existing systems.

More specifically, in an embodiment, the present invention provides a novel application integration and event processing program (i.e., server) that creates unified and personalized applications on demand out of existing Web services, communications systems, legacy assets, and databases for several types of applications without invasive programming. Such composite applications include federated search, event correlation, profiling, message alerting, data extraction, document processing, link analysis and the like.

In alternate embodiments, the application integration and event processing server of the present invention can be configured to operate as a central server, on individual desktops, or in distributed settings.

Further, in an embodiment, the present invention also provides a novel Extensible Markup Language (XML)-based open markup language used to build the above-listed applications. This allows real-time composite applications to be easily created and changed while minimizing low-level coding by using a set of pre-defined templates based on the present invention's XML-based open markup language. Thus, the time and expense typically required to create similar solutions from scratch can be lessened.

An advantage of the present invention is that it allows automated reactive processes and new applications to be built on top of existing systems, applications, Enterprise Application Integration (EAT) message buses and data sources.

An advantage of the present invention is that it allows multiple independent systems and sources to be queried from a Web browser in one click.

An advantage of the present invention is that it allows relevant data to be delivered to the users that need to know via multiple channels (e.g., Instant Message, dashboard, e-mail, wireless, etc.) when important events occur or data is updated or changed across distributed sources and applications.

Another advantage of the present invention is that it can monitor, filter, mine, and assimilate data from disparate sources including the Web, XML sources, free text, databases, legacy systems, live message feeds, and electronic mail systems in real time.

Another advantage of the present invention is that it can integrate and cross-reference data across distributed information systems and firewalls, alongside or in place of traditional EAI message buses.

Yet another advantage of the present invention is that it can fuse data in real time from disparate information sources into interactive portal windows, dashboards, Instant Messages, and e-mail reports.

Yet another advantage of the present invention is that can extract data from diverse systems throughout an organization for instant review, analysis, distribution, and audited feedback.

Yet another advantage of the present invention is that can construct intelligent applications that run without human intervention including those for data routing, searching, status tracking, and asset monitoring that operate across many existing systems.

Further features and advantages of the invention as well as the structure and operation of various embodiments of the present invention are described in detail below with reference to the accompanying drawings.

BRIEF DESCRIPTION OF THE FIGURES AND APPENDICES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 1A-E are block diagrams illustrating a business enterprise network environment in which the present invention would be deployed in various embodiments.

Figure 1A:
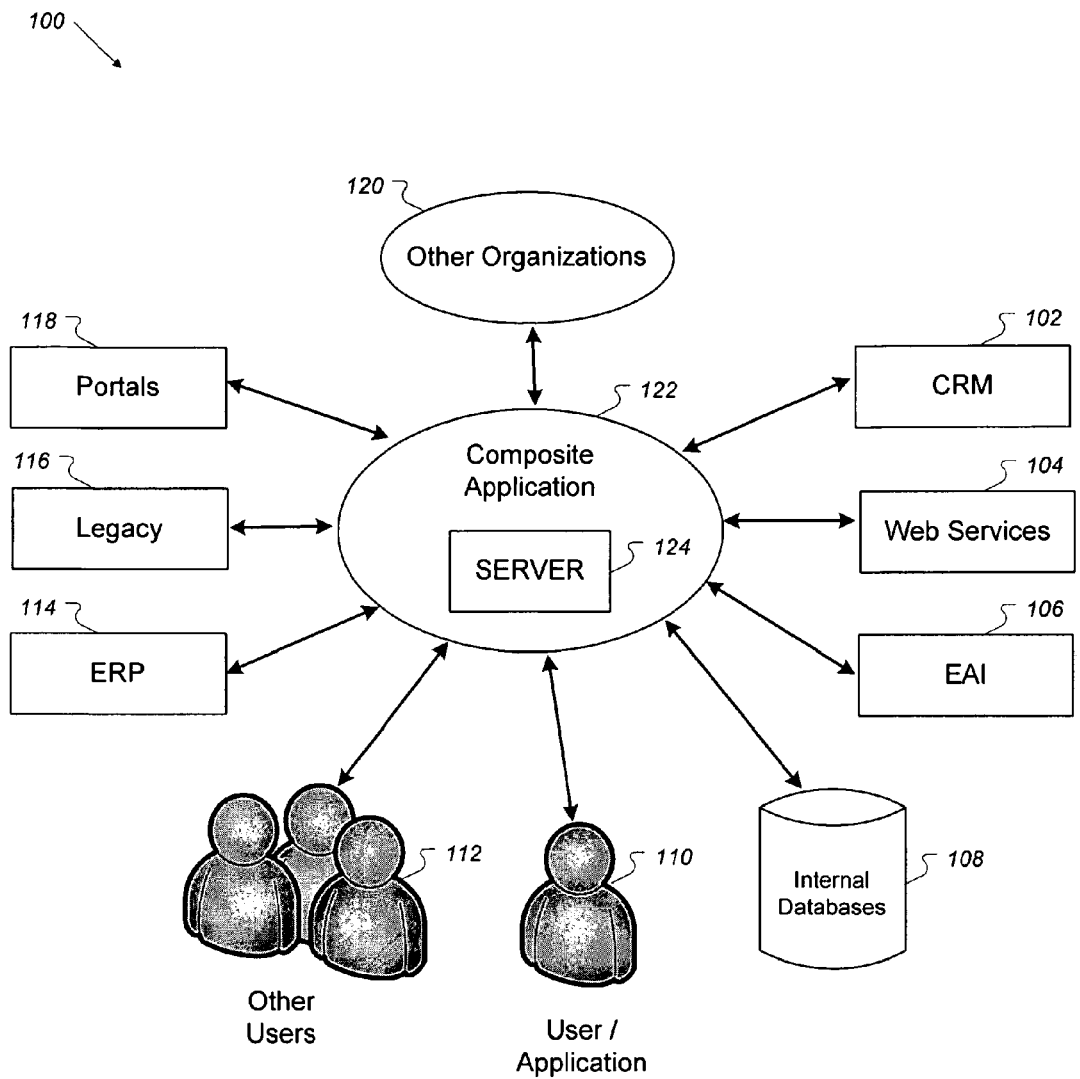

Appendix A is a fully-commented listing of a pre-defined source template (i.e., Document Type Definition (DTD)), in an embodiment, for the XML-based open markup language of the present invention.

Appendix B is a fully-commented listing of a pre-defined object template (i.e., a DTD), in an embodiment, for the XML-based open markup language of the present invention.

Appendix C is a fully-commented listing of a pre-defined alert template (i.e., a DTD), in an embodiment, for the XML-based open markup language of the present invention.

DETAILED DESCRIPTION

I. Overview

The present invention is directed to a system, method and computer program product for providing data event processing and application integration.

In an embodiment, the present invention provides an application integration and event processing server which can be configured to operate as a central server, on individual desktops, or in distributed settings. Applications executing on the server can exploit the presence of multiple distributed sources by interacting with those sources on an user requested or automated basis, reacting to information (i.e., processing events) from those sources based on pre-defined rules and allowing real-time composite applications to be rapidly built on top of existing systems. Such exploitation includes the ability to bring information and/or functionality together from, while interacting with, such multiple distributed sources without the need for any physical merging (i.e., by layering).

The present invention also provides, in an embodiment, an XML-based open markup language which allows the above-mentioned applications that interact with many disparate information sources to be easily created and changed without requiring low-level coding by using a set of pre-defined templates. The XML-based open markup language allows software developers to take advantage of the application integration and event processing server of the present invention to easily deploy and reuse sophisticated application integration components while saving the time and expense typically required to build similar solutions from scratch.

The present invention is now described below in terms of the above examples. This is for convenience only and is not intended to limit the application of the present invention. In fact, after reading the following description, it will be apparent to one skilled in the relevant art(s) how to implement the following invention in alternative embodiments.

Further, the present invention is now described below in terms of an example network organized in an hierarchy where there is a system administrator (initially, with username/password system/system). This administrator has the ability to create new domains within the server of the present invention. Then, each domain can have one or more groups associated with it. Finally, each group will contain a number of (end) users. Again, this is for convenience only and is not intended to limit the application of the present invention. In fact, after reading the following description, it will be apparent to one skilled in the relevant art(s) how to implement the following invention in alternative embodiments.

The terms "user," "developer," "enterprise," "company," and the plural form of these terms are used interchangeably throughout herein to refer to those who would access, use, and/or benefit from the server and XML-based open markup language that the present invention provides for data event processing and application integration.

II. System Architecture

Referring to FIG. 1A, a block diagram illustrating a business enterprise network 100 environment in which the present invention would operate in an embodiment is shown.

Network 100 illustrates a business process (e.g., an application) 122 which needs to exploit multiple distributed sources in order to accomplish a business process for a particular enterprise. Such sources include, for example, one or more CRM applications 102, Web services 104, Enterprise Application Integration (EAI) message buses 106, internal databases 108, users and other applications 110, external user data 112, Enterprise Resource Planning (ERP) systems 114, legacy systems 116, portals 118 and an external source (e.g., data from external organizations) 120.

According to an embodiment, rather than having a software developer build application 122 from scratch and expending a great deal of time and expense, it can be built using an application integration and event processing ("AIEP") server 124 of the present invention. AIEP server 124 brings information together from multiple distributed sources 102-120, interacts with these sources on an automated basis, reacts to information based on pre-defined rules and allows real-time business application 122 to be rapidly built on top of existing systems within network 100.

In a preferred embodiment, server 124 is based on a scalable architecture leveraging Java and XML. In an embodiment, server 124 of the present invention may run on Microsoft® Windows® NT/2000/ME/98, Solaris, or Linux® operating systems executing on at least an Intel® Pentium® 600 Mhz processor with 512 MB of RAM.

FIGS. 1B-1E describe various distributed implementations of AIEP server 124. As will be appreciated by one skilled in the relevant art(s) after reading the description herein, by leveraging these various architectures, AIEP server 124 can be configured to handle large volumes of data, large numbers of users, and/or large volumes of data requests that require immediate feedback.

Figure 1B:
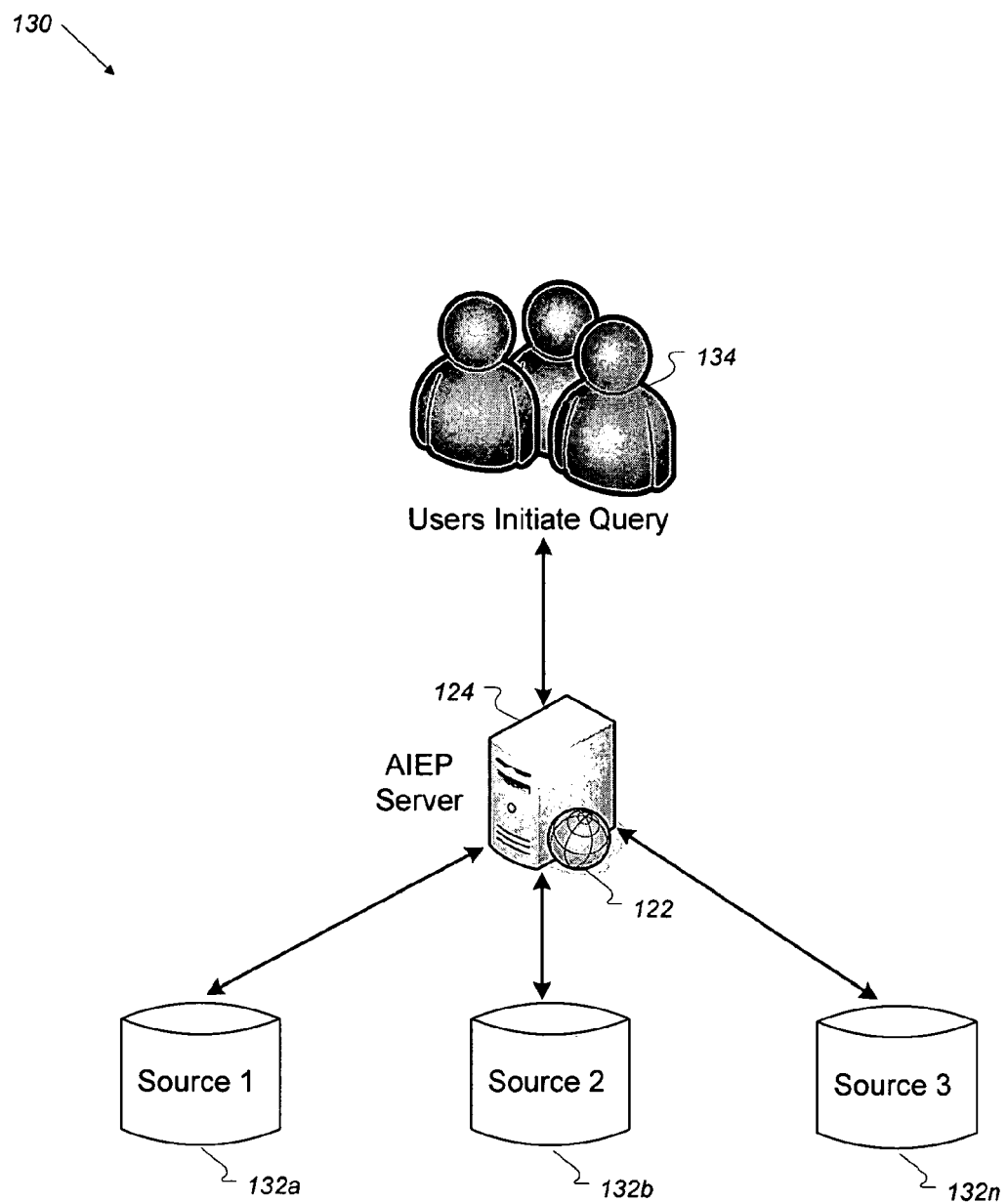

Referring to FIG. 1B, a block diagram illustrating a business enterprise network environment 130 in which the present invention would operate in an embodiment is shown. Network 130 shows a single-server embodiment with the use of one AIEP server 124 for handling requests from users 134 and background data event processing via application 122 by bringing information together from multiple distributed sources 132 (shown as sources 132a-n).

Figure 1C:
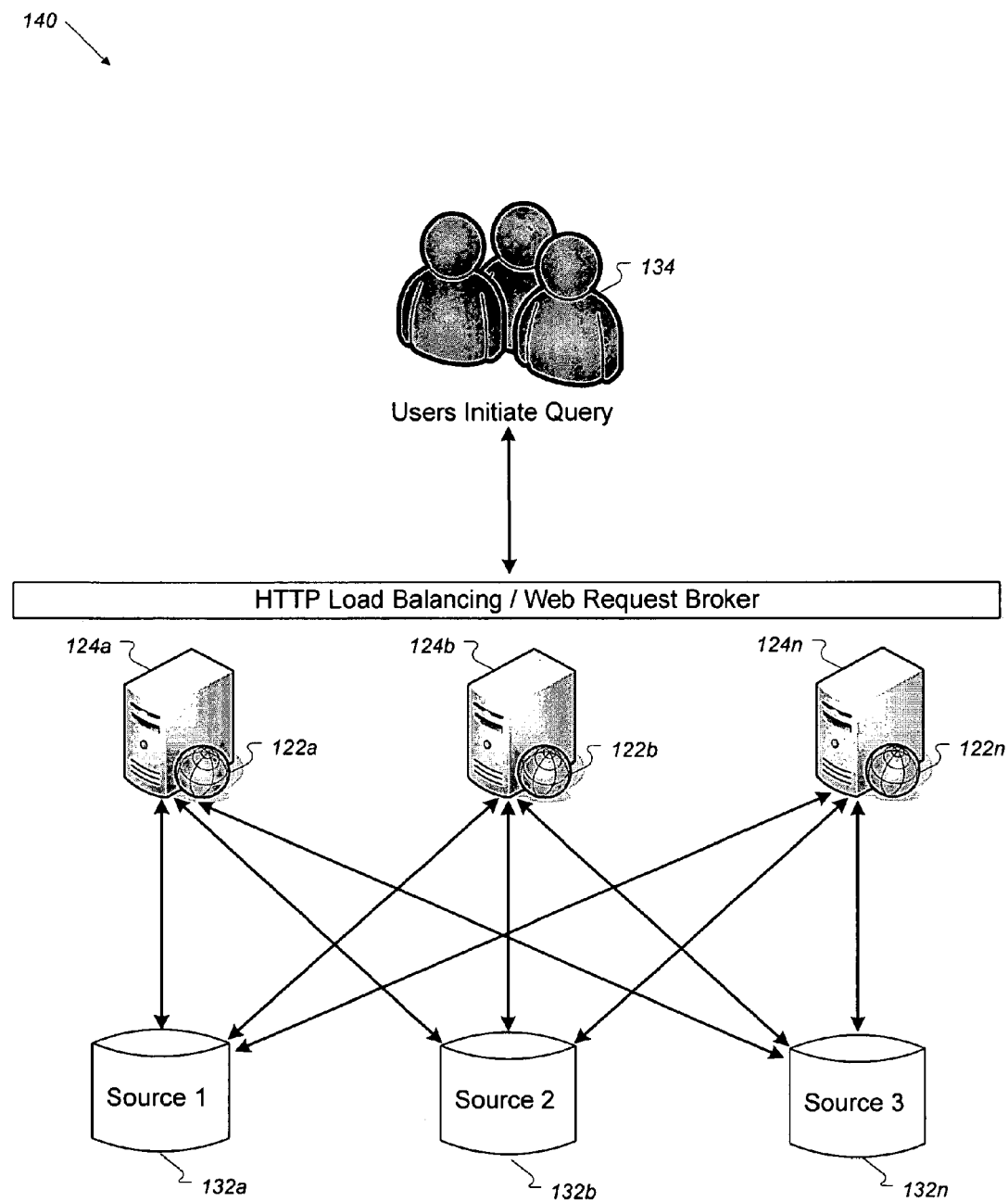

Referring to FIG. 1C, a block diagram illustrating a business enterprise network environment 140 in which the present invention would operate in an embodiment is shown. Network 140 shows a load balancing embodiment where a plurality of AIEP servers 124 (shown as servers 124a-n) are distributed. Multiple servers 124 may be installed within network 140 to perform the same function (i.e., by executing copies 122a-n of a specific application), such as serving as a federated query server where many users 134 are simultaneously requesting access to remote sources 132 in order to return fused results. In this configuration, users 134 would enter a common Uniform Resource Locator (URL) and be transparently directed to different servers 124.

Figure 1D:
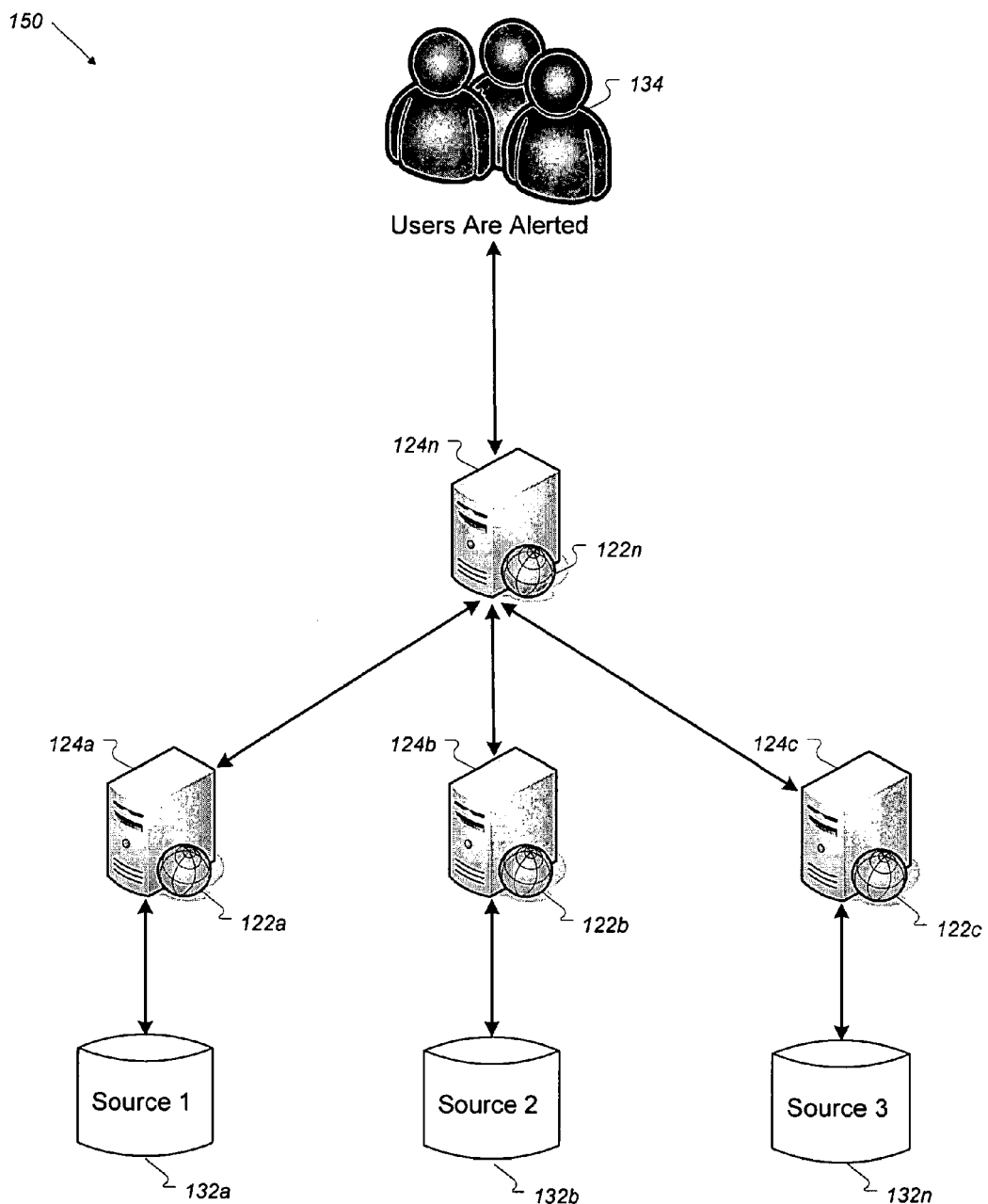

Referring to FIG. 1D, a block diagram illustrating a business enterprise network environment 150 in which the present invention would operate in an embodiment is shown. Network 150 shows a tiered embodiment applicable for applications 122 with significant amounts of background data processing such as alerting or document processing. In this embodiment, individual servers 124a-n are responsible for specific data inputs. All servers 124a-n within network 150 share the same rules and user profiles, but are simultaneously looking at different data. If a condition is met that matches a user profile, rather than alerting a user 134 directly, that information would then be passed in the form of an XML message (or any other appropriate format) to other servers 124 specifically responsible for dissemination. A tiered approach allows for extremely large numbers of users 134 and profiles.

Figure 1E:
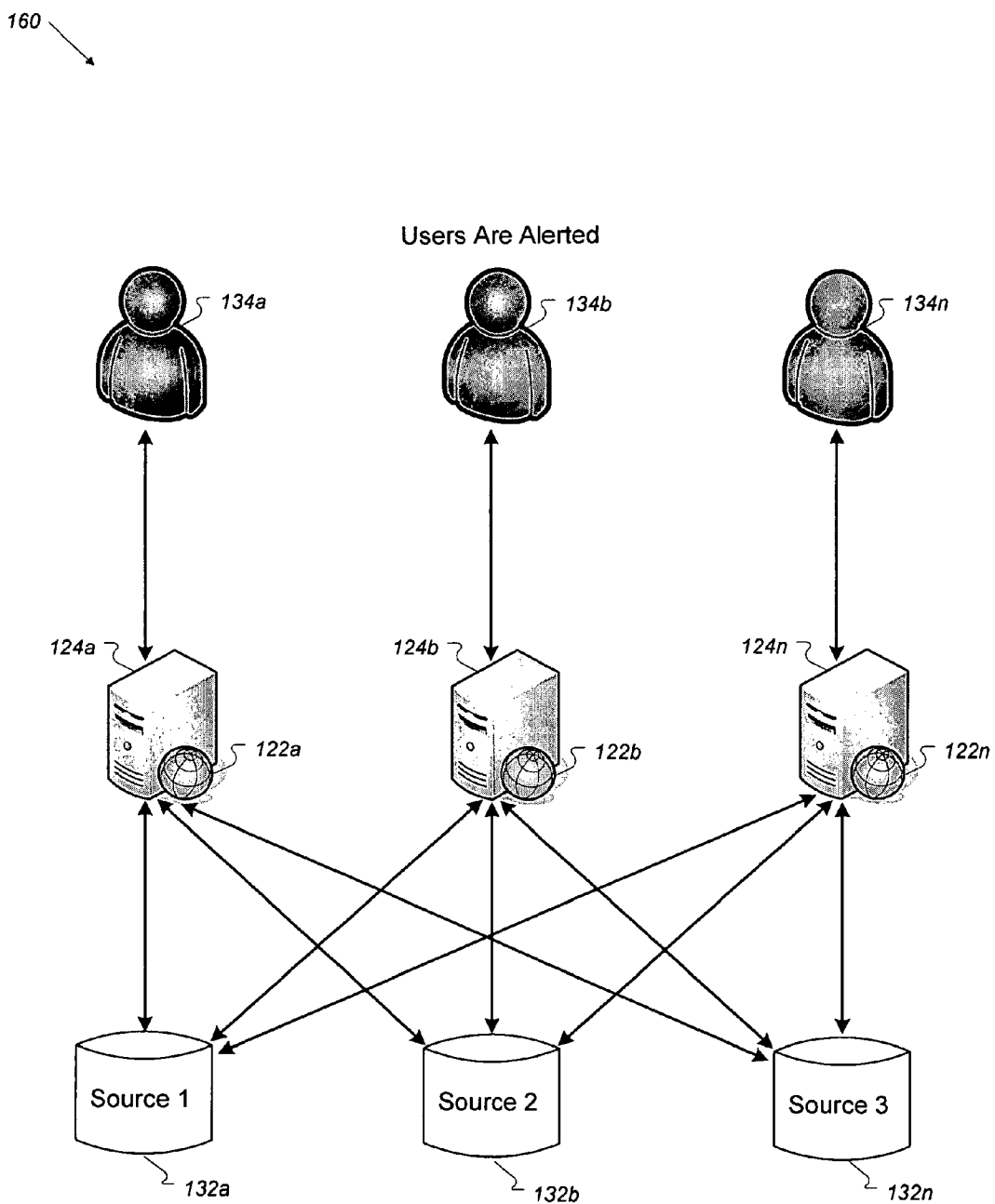

Referring to FIG. 1E, a block diagram illustrating a business enterprise network environment 160 in which the present invention would operate in an embodiment is shown. Network 160 shows a parallel embodiment where background data processing applications 122a-n may also be configured to leverage multiple servers 124a-n that all connect to the same data sources 132a-n, but process data for only certain profiles or rules sets. In this embodiment, each server 124 would handle a specific percentage of the processing, or processing for a range of users 134.

More detailed descriptions of AIEP server 124 and its components, as well their functionality, and applications 122 are provided below.

III. Application Integration and Event Processing Server

As mentioned above, rather than having a software developer build application 122 from scratch and expending a great deal of time and expense, it can be built using the application integration and event processing server 124 provided by the present invention.

Figure 2:
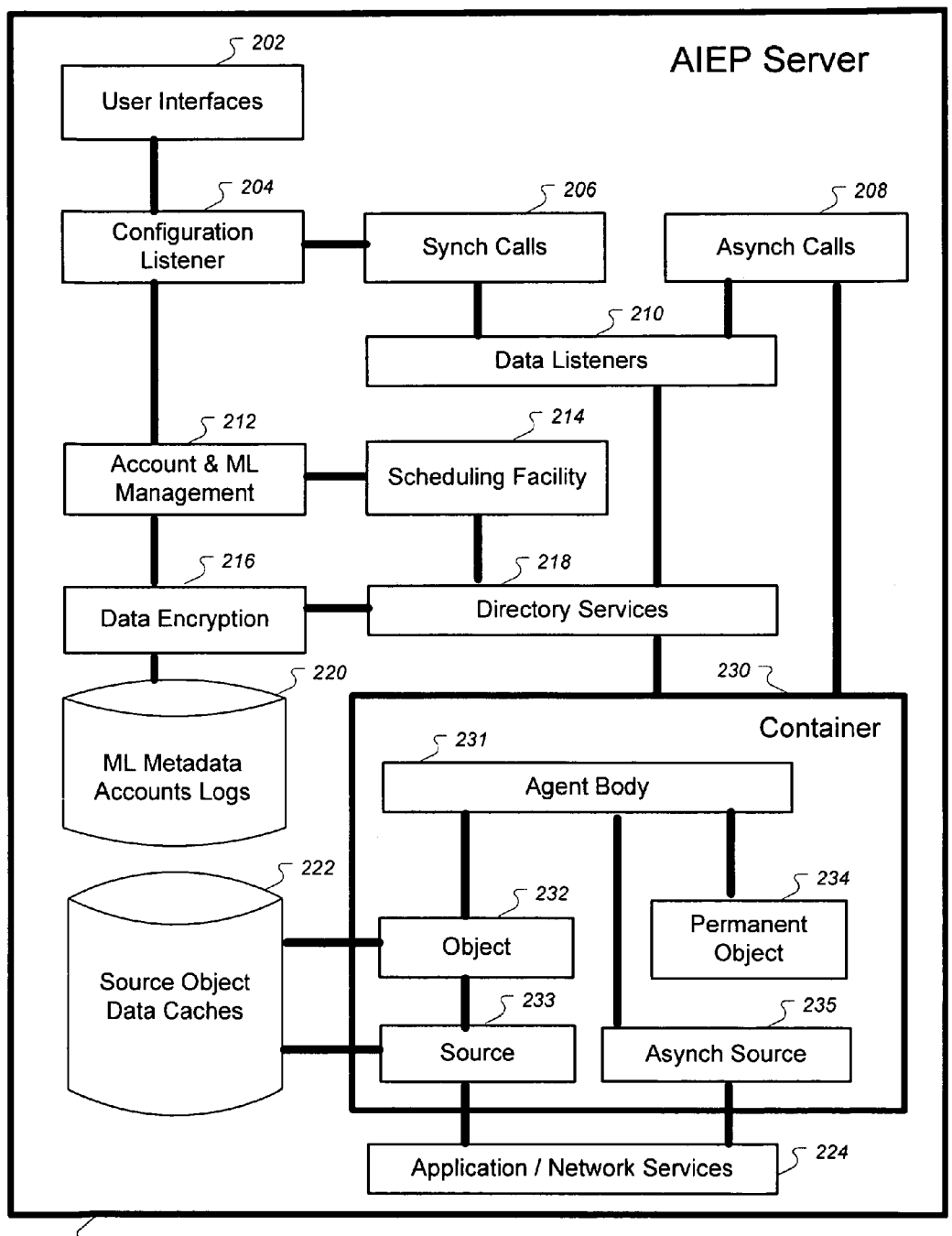
FIG. 2 is a block diagram illustrating the architecture of an application integration and event processing server according to an embodiment of the present invention.

Referring to FIG. 2, a block diagram illustrating the architecture of an AIEP server 124, according to an embodiment of the present invention, is shown. In such an embodiment, as will be appreciated by one skilled in the relevant art(s) after reading the description herein, server 124 is a computer program product having the interacting components (i.e., modules) shown in FIG. 2, wherein each module has control logic to achieve the functions described in detail below within the environment of, for example, network 100.

The architecture of an AIEP server 124 includes a user interfaces (UI) module 202 which allows a developer to create, test and modify applications 122 and users of network 100 to use, modify and create such applications 122. UI module 202, in alternate embodiments, would allow users to access server 124 via network 100 or an interne, extranet or any other custom user interface.

AIEP server 124 includes a configuration listener 204 that manages the applications 122 executing on server 124 and user configurations. Configuration listener 204 acts as a gateway between UI module 202 and the other modules of server 124.

A synchronous calls module 206 handles all calls made to applications 122 that are activated synchronously. In an embodiment, module 206 is able to receive such synchronous calls via XML-remote procedure calls (RPC), Web services, browsers, custom applications, message networks and other application servers.

An asynchronous calls module 208 handles all calls made to applications 122 that are activated asynchronously. In an embodiment, module 208 is able to receive such asynchronous calls via e-mail, browsers, Instant Messaging, message networks, other application servers, custom applications, Hypertext Transfer Protocol (HTTP) or Hypertext Transfer Protocol Secure (HTTPS) servlet, Transmission Control Protocol over Internet Protocol (TCP/IP) connection, Simple Object Access Protocol (SOAP)/XML-RPC, Instant Messaging, Internet Message Access Protocol (IMAP) messages, Java Remote Method Invocation (RMI) calls, or any other message (e.g., a message from IBM's WebSphere MQ family of products) or custom event.

A data listeners module 210 handles incoming data from modules 206 or 208 and passes data to the appropriate applications 122 executing on server 124. That is, in an embodiment, module 210 takes data received form modules 206 and 208, and parses the data in order to determine the name and owner of the source/object/alert to pass to module 218 for lookup.

An accounting and markup language management module 212 provides command line and Windows GUI administration tools that allow developers to create, delete, view, copy and modify the XML-based open markup language ("XBOML") documents the present invention provides for creating applications 122. In an embodiment, the administration tools of module 122 also allow developers to test applications and configure accounts, manage permissions and attributes of multiple domains and individual profiles for users and groups and perform general system administration including a publish/subscribe management function. In an embodiment, module 212 also includes security and user auditing capabilities that can be adapted to diverse developer requirements for managing a large number of applications 122 on a single server 124.

Server 124 contains a scheduling facility module 214 which acts as a built-in scheduler for all applications 122. That is, module 214 reads the activation dates of applications 122 and then sorts them accordingly. When it is time for an application 122 to be activated, a request is then enqueued. In an embodiment, starting/ending dates, specific activation times, and time and calendar-based intervals may be specified for all applications 122.

A Data Encryption module 216 is capable of encrypting all sensitive data accessed in XBMOL documents (i.e., applications 122) while executing on server 124. In an embodiment, module 216 uses Triple Data Encryption Standard (DES) encryption for all such sensitive data.

A directory services module 218 provides account and application lookup for server 124.

Server 124 contains (or, in an alternate embodiment, is coupled and has access to) a markup language metadata and accounts storage 220. Storage 220 is a central store for account-related information and activity logs for server 124 (e.g., information created, accessed and modified by accounting and markup language management module 212). In an embodiment, storage 220 is a relational database (e.g., MySQL, Oracle, Microsoft SQL Server or the like).

Server 124 also contains a collection of source and object data caches 222 that contains frequently-accessed data that needs to be shared among multiple users within network 100. Data caches 222 ensure that when a user or external application proactively queries an application 122 (e.g., requesting an information report), or when an application 122 needs to determine if some type of activity has occurred in a data source, results can be returned in near real time. By placing all relevant data in data caches 222 before they are requested or checked, server 124 can provide maximum performance for the most complex information activity in the most demanding applications 122. Caches 222 also help reduce network 100 traffic by managing the retrieval of frequently used data.

Server 124 also contains an Application/Network Services module 224 that contains code logic that allows an application 122 to communicate with network 100 components via various communications protocols (e.g., Telnet, FTP, HTTP/HTTPS/Web Services (XML-RPC/SOAP), TCP/IP, JDBC/ODBC, MQSeries/Other EAI buses, POP3, Custom API Calls and the like).

Server 124 contains one or more instances of an application container 230 (although only one is shown in FIG. 2 for simplicity of explanation herein) that wraps instantiations of a particular group of sources, objects, and alerts that comprise an application 122. In an embodiment, application container 230 allows cross-referencing of variables within wrapped instantiations.

Application container 230 and its components are described in more detail below.

IV. Open Markup Language

As mentioned above, in an embodiment of the present invention, an XML-based vocabulary is defined and provided so that developers can create applications 122 that execute on AIEP server 124 within network 100. In such an embodiment, the XML-based open markup language ("XBOML") describes the location of data sources and applications throughout network 100, as well as how to conduct automated processes using its resources. XBOML is dynamic such that it can be easily updated to reflect new or changed business processes and data sources without requiring complex re-engineering efforts. By implementing XBOML, organizations can realize massive IT savings as well as improve the efficiency and quality of many business processes.

While many different types of AIEP server-based applications may be created using the XBOML provided by the present invention, generally they are characterized by being able to be activated on schedules, by remote systems, by user request (e.g., by clicking a button on a Web page or sending an Instant Message), or when any data event happens, such as a priority customer issuing a support request or the appearance of a new document in a reports system. When activated, such applications can automatically interact with disparate systems (e.g., sources 102-120), store information in databases, or even engage in automated two-way communication with users, groups, and entire enterprises via e-mail or Instant Messaging.

In an embodiment, AIEP server-based applications are created by utilizing three types of XBOML document files—sources, objects, and alerts. These three types of documents allow one or more AIEP server-based applications 122 executing on an AIEP server 124 to exploit data and functionality from multiple sources and applications. Such exploitation includes the ability to bring information and/or functionality together from, while interacting with, such multiple distributed sources without the need for any physical merging.

First, source XBOML document files specify the locations of data sources, applications, analytic engines and other enterprise network 100 resources (e.g., sources 102-120) accessed during execution of applications 122. Sources act as a data abstraction layer providing mappings to application program interfaces (APIs) of the heterogeneous sources (e.g., sources 102-120). In an embodiment, a pre-defined source template (i.e., a Document Type Definition (DTD)) for the XBOML of the present invention is given in Appendix A. As will be appreciated by those skilled in the relevant art(s), example sources handled by the DTD of Appendix A in an embodiment of the present invention are listed in Table 1. Within server 124, low-level connections to these sources are handled by services module 224.

TABLE 1

| Example Sources |
| --- |
| Web sources, forms, and applications |
| POP3/IMAP (e.g., alerts) |
| TCP/IP streams |
| Text and binary files |
| XML-RPC/SOAP Web Services |
| Telnet, FTP |
| WebSphere MQ |
| JMS |
| COM |
| ODBC/JDBC: MySQL, Oracle, SQL Server, Excel, Lotus Notes |
| Other Enterprise Application Servers |
| Incoming HTTP/HTTPS |
| Incoming Instant Messages |
| RMI |
| Internal cache |
| Custom (ADO, legacy, EAI) |

Second, object XBOML document files specify how any data retrieved from data sources should be parsed, organized and typed. Objects are also used, in an embodiment, as convenient storage mechanisms for data. In an embodiment, a pre-defined object template (i.e., a DTD) for the XBOML of the present invention is given in Appendix B.

Third, alert XBOML document files specify data analytics, message delivery and any other event-driven or application-driven processing. Alerts contain a list of instructions that tell server 124 what to do with the data returned by objects. Alerts are activated by a variety of events as described below. In an embodiment, a pre-defined alert template (i.e., a DTD) for the XBOML of the present invention is given in Appendix C. As will be appreciated by those skilled in the relevant art(s), example alerts types implemented by the DTD of Appendix C in an embodiment of the present invention are listed in Table 2.

TABLE 2

Example Alerts Types

Behavior over time
Maintain state
Decision trees (if/then/else)
Statistical processing
Boolean logic
Pattern matching
Pre-defined triggers
Multi-event correlation
Differential change detection
Web-accessible user profiling
Reporting engine
Data transformations and filtering
Custom functions, engines, API calls In an alternate embodiment of the present invention, the DTDs of Appendices A, B and C may be used by a developer to create applications 122 for execution on AIEP server 124 though a one or more commercially-available tools such as the XMLSPY® XML software development tool available from Altova, Inc. of Beverly, Mass. This would allow the DTDs to be seamlessly referenced during creation of an application 122 and would support automatic element and attribute fill-in and definition look-up.

In yet another embodiment, as will be appreciated by those skilled in the relevant art(s) after reading the description herein, the creation of applications 122 based on XBOML can be simplified through the use of automated GUI-based wizards. That is, rather than being forced to write XBOML from scratch, developer-users can generate XBOML automatically by navigating through a series of dialogs. These dialogs prompt the user to enter text and make selections where appropriate, freeing the user from worrying about XBOML syntax. One such automated GUI-based wizard system is described in commonly-owned, co-pending U.S. Provisional Patent Application No. 60/464,963, filed concurrently herewith entitled "Graphical User Interface for a Real-Time, Event-Driven Composite Applications Server" which is hereby incorporated by reference in its entirety.

V. AIEP-Server Based Applications

Figure 3:
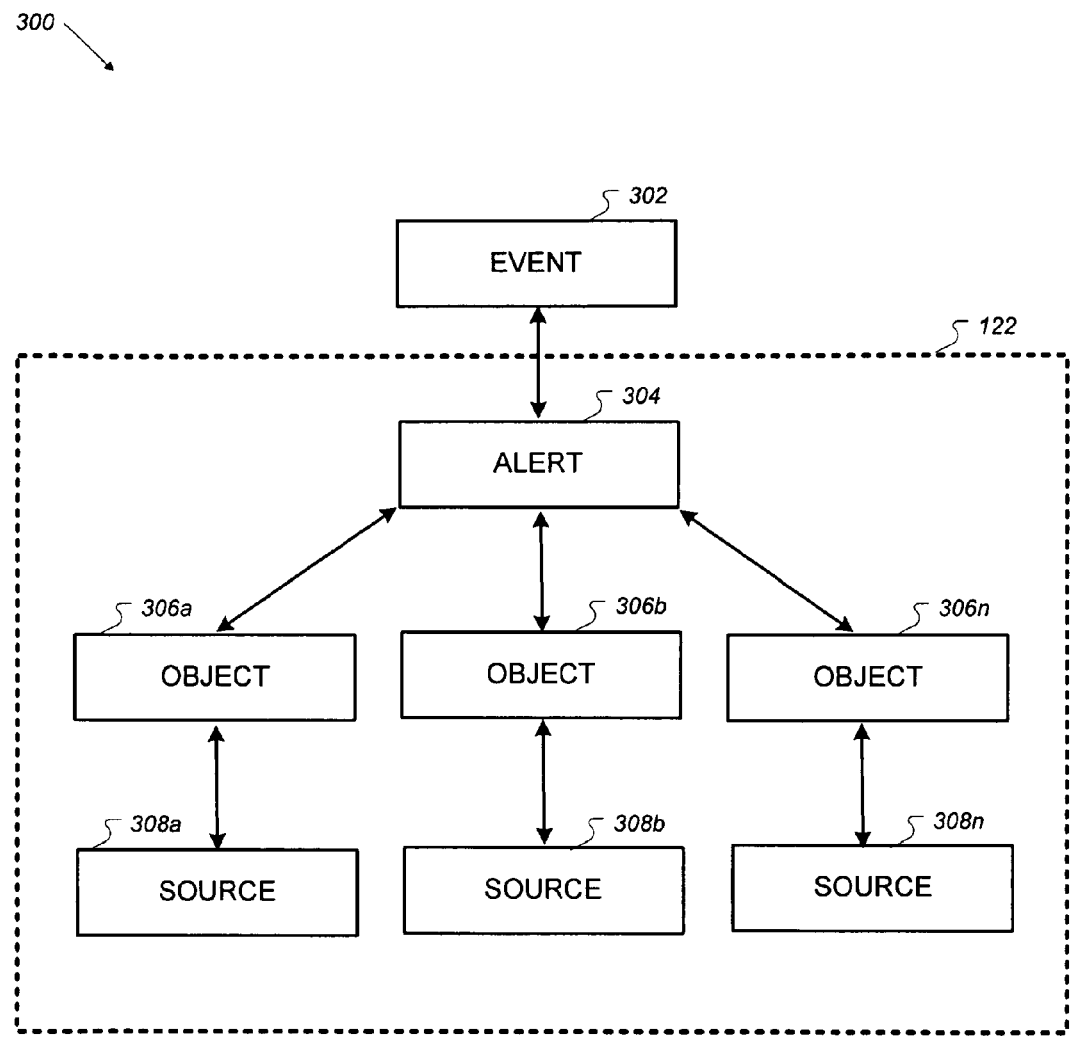
FIG. 3 is a block diagram illustrating the operational data flow of a business enterprise application written according to an embodiment of the present invention.

Referring to FIG. 3, a block diagram illustrating an event 302 activating an alert 304 that is tied to multiple objects 306 (shown as objects 306a-n) and multiple sources (shown as sources 308a-n) is shown. That is, FIG. 3 illustrates, in an embodiment, operational flow of data 300 of an application 122 written in the XBOML provided by the present invention for execution on AIEP server 124.

In an embodiment, alerts 304 (within an application 122) can be activated by at least three different classes of events 302—scheduler, listener, or application events.

First, in an embodiment, the built-in scheduler 214 of server 124 reads activation dates of all alerts 304 for all applications 122 and then sorts them accordingly. When it is time for an application 122 to be activated, a request is enqueued.

Second, in an embodiment, listener events 302 can be in the form of Java servlets, IMAP servers, Instant Messaging servers, and other custom sources. Listener events 302 do not poll for data but instead passively listen for incoming events such as a TCP/IP connection or a message (e.g., a message from IBM's WebSphere MQ family of products). When a request is received from a user or system through a listener event 302, it can either add it to the queue or begin a synchronous request.

Third, in an embodiment, events 302 within application 122 can activate alerts 304 in other applications 122 through instructions contained within alerts 304. For example, an alert 304 can processes a tag, <action name="alert">, which contains the name of an application 122 to activate in addition to name/value parameters that can be passed to the called application. Depending upon the instruction presented in the <alert> tag, either a synchronous or asynchronous call can be made to the called application. In an alternate embodiment, applications 122 located on remote servers 124 can also be activated by specifying the host address to allow for distributed data sharing, integration, and processing.

In an embodiment, sources 308, objects 306, and alerts 304 can be created either on the user level or the group level. Only group administrators have the ability to create, modify, and remove these documents, but users belonging to the group can execute group alerts. Domain administrators have the ability to create, modify, and remove groups.

In an embodiment, the "namespace" attribute of sources 308, objects 306, and alerts 304 denotes to which user or group the XBOML belongs. Namespaces containing a group name (in the form "domain/group") are group files, and namespaces containing a single account name are user files. Users do not have the permissions to call files with user namespaces other than their own; however, if a user belongs to a group, the user is allowed to execute or view a file containing that group's namespace.

In an embodiment, each user, group, and domain has a unique profile that is represented in XBMOL. For users, the profile contains a list of group memberships and group/domain administration grants, as well as other information specific to the user such as event notification delivery parameters. Group alerts 304 can take advantage of properties contained within user profiles to perform actions such as sending multi-system notifications of events 302. For groups and domains, the profile contains a list of users that have the permissions to administer them. In addition, group profiles contain a list of users who belong to the group, and domain profiles contain a list of groups contained within the domain.

Having explained the components of the XBOML provided by the present invention, attention is now returned to FIG. 2.

Within application container 230 is an application body 231 (i.e., collection of alerts of Table 2). Also within application container 230 is objects store 232 that stores objects 306 which specify how application 122 will parse, organize and type any data retrieved from data sources 308. Object store 122 is capable of performing XML, HTML, text and hexadecimal parsing, transform data to pre-defined types (e.g., character, string, number, list, table, boolean, date/time, or any custom type definition) and can perform pattern matching, filtering, formatting and searches for data.

Also within application container 230 is source 233 which specify the locations of data sources, applications, analytic engines and other enterprise network 100 resources (e.g., sources 102-120) accessed during execution of the wrapped instantiation of application 122 that forms application container 230. That is source 233 denotes the execution/processing of an instantiation of a source 308, and also specifies the refresh properties for caches 222, interactions (i.e., pre-defined commands to send to services 224) and login/authentication data.

Permanent objects store 234 contains global persistent variable storage/retrieval for the wrapped instantiation of application 122 that forms the application container 230 and allows automatic persistence without explicit database queries.

In an embodiment, in order to increase execution speed, an application 122 will want to reference a source 308 without waiting for a result to be returned. For example, a source 308 that posts to a form or runs a SQL "insert" query would not produce any relevant output aside from confirmation of success. In such a case, asynchronous sources are used and stored in module 235.

As will be appreciated by one skilled in the relevant art(s) after reading the description herein, it is possible to use an alert 304 in and of itself without a source 308 or object 306 to create an application 122. That is, in alternate embodiments, combinations to form an application 122 can include: an alert 304; an alert 304, object 306 and source 308; an alert 304 and object 306; and alert 304 and source 308. Further, in an embodiment, both sources 308 and objects 306 can make references to other objects 306.

VI. AIEP-Server Based Application Processing

Figure 4:
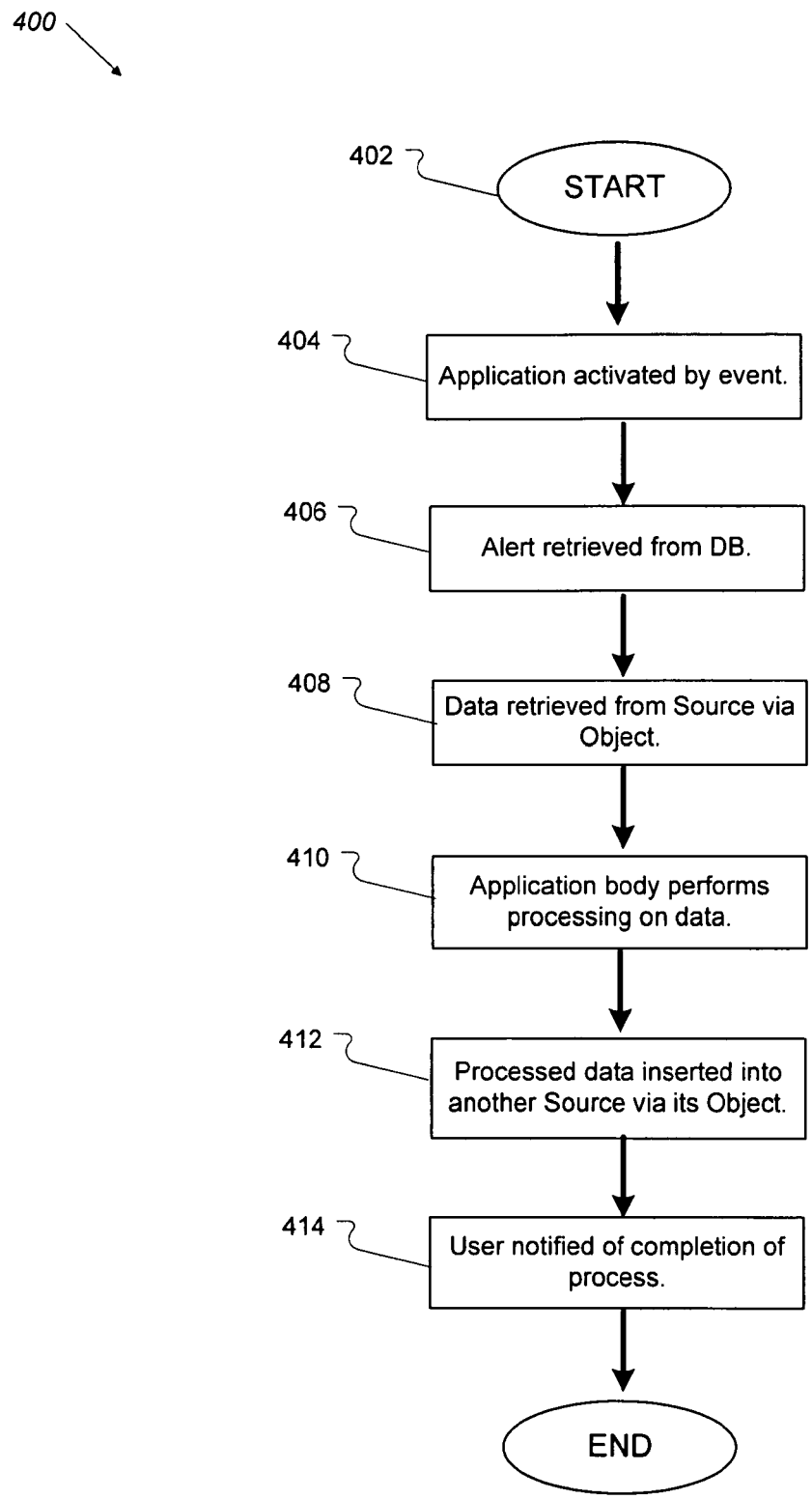
FIG. 4 is a flowchart illustrating the execution process of a business enterprise application according to an embodiment of the present invention.

Referring to FIG. 4, a flowchart illustrating the execution process 400 of an application 122 according to an embodiment of the present invention is shown. Process 400 begins at step 402 with control passing immediately to step 404.

In step 404, an event 302 activates an application 122 and processing begins.

In step 406, the XBOML definition of application's alert 304 is retrieved from application body 231. The alert definition, in an embodiment, contains a series of instructions that can include data retrieval, analysis through mathematical and statistical methods, data output and routing through e-mail and other services, and various other functionality.

In step 408, data is retrieved from a source 308 via alert 304 instructions to access one or more objects 306. The XBOML for this instruction, in an embodiment, is:
 <value object-name="myobject"/>
When server 124 reads this instruction, it parses the value of the "object-name" attribute and then begins processing of the object 306 with the given name. The definition of the object(s) 306 is retrieved from object store 232 in the application container 230 and then read one instruction at a time. When objects 306 are used for parsing retrieved data, the object will first have to contact a source 308, which is responsible for the actual data retrieval. In an embodiment, reference to source 308 is made through the following XBOML:

```
<object name = "myobject" namespace="user" creator="user"
source-name ="mysource">
    <parse> ... </parse>
</object>
```

In the above example, the "namespace" attribute denotes to whom this object 306 belongs. Thus, there can be multiple objects 306 (or alerts 304, or sources 308) with the same name, but they will be unique if the namespace property is different. The "source-name" attribute has the same purpose as the "object-name" attribute in alert 304; it instructs server 124 to retrieve the definition of the source with that name.

In step 410, application body 231 performs processing on the data. That is, source 308 is executed, which causes information (typically one or more documents or pieces of data) to be retrieved using one of a number of services available within server 124 via services module 224. To accomplish this, the source 308 definition is passed to the Java class file representing the service that the source references; for example, an <http> element would cause the HTTP service to be activated by module 224. The service then breaks down the definition, extracting the elements and attributes contained within <http> that represent the location of the data. The result of the source is:

```
<content type="text">
    <document name="mydoc" index="0">The temperature is 72
    degrees.</document>
</content>
```

In step 412, once source 308 has retrieved the requested information, it gives it to object 308 which then performs parsing and typing on this information as described by the <parse> element. Once that is complete, the converted data is passed back to the alert in step 414. A call to <value object-name="myobject"/> may therefore result in the following once the object and source have been executed:
 <value="string">The temperature is 72 degrees.</value>
Process 400 would then end as indicated by step 416.

In an alternate embodiment, in order to increase execution speed, asynchronous sources are called using <action> elements, as in the following example:

```
<action name="source">
    </value>
        <items>
            <item name="name">mysource</item>
        </items>
    </value>
</action>
```

In yet another embodiment, there are some applications 122 that require simultaneous execution by multiple users. However, it is often not necessary to re-download or re-parse the desired information if it changes infrequently. For this reason, source and object caches 222 can be utilized to store such data. In order for a developer to have a source 308 utilize cache 222, the definition must be modified accordingly. An example is as follows:

```
<source name="mysource" namespace="user" creator="user"
service="http" active="yes" lifetime="300">
    <http> ... </http>
</source>
```

Setting "active" to "yes" tells server 124 to store the downloaded information in caches 222 for the duration specified by the "lifetime" attribute, which in this example is 300 seconds.

The first time source 308 is executed, the download will take place and the resulting document will be stored in source cache 222. On all subsequent executions, however, the document will not be re-downloaded; instead, the document will simply be pulled from cache 222. After 300 seconds (and every 300 seconds thereafter), source 308 will automatically be called and cache 222 will be updated.

Once a cached source 308 has been parsed by object 306, the result is then stored in object cache 222. Then, if object 306 is called prior to the completion of the 300-second lifetime, the data is pulled from object cache 222 instead of the system having to re-parse the source 308. When the 300-second period expires and server 124 updates the contents of source cache 222, it removes the associated entry in object cache 222 at the same time. Thus, the first object 306 execution request made subsequent to the source 308 refresh must perform the required parsing.

VII. Example Implementations

Figure 5:
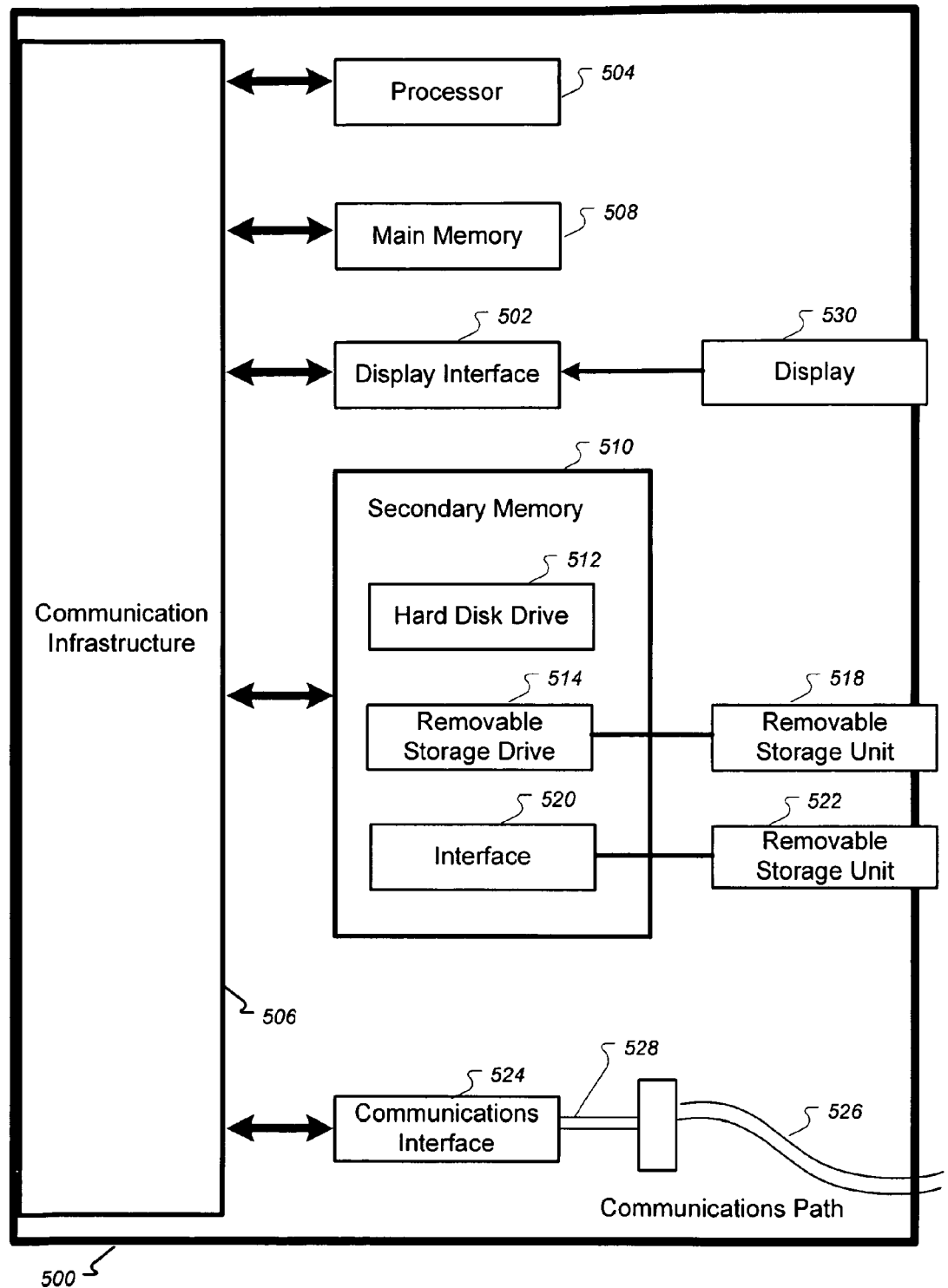
FIG. 5 is a block diagram of an exemplary computer system useful for implementing the present invention.

The present invention (AIEP server 124, operational flow 300, process 400 or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 500 is shown in FIG. 5. The computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

VIII. AIEP-Server Based Application Examples

The following section represents a variety of integrated, event-aware applications 122 that can be easily constructed using the XBOML of the present invention to execute on AIEP server 124.

Information Sharing and Alerting

In one embodiment, Information Sharing and Alerting applications 122 can be created that automatically disseminate key data via multiple channels when events occur that match personal monitoring profiles. On a 24/7 basis, server 124 automatically processes data and events from existing enterprise data sources such as EAI message buses, search engines, databases, live data streams, incoming e-mail reports/alerts, and legacy systems. Based on pre-defined profiles, any new or changed data can be extracted and delivered directly to systems in other organizations, or to multiple users in the form of alerts (e.g., e-mail, pager, Instant Message, real-time Web browser display). Alerts delivered to users can include "actionable" hyperlinks that execute pre-defined responses at the click of a button. These links, when clicked, can drill down to the data itself, or initiate commands to disseminate the messages or the original data to pre-defined groups. Server 124 also proactively monitors to make sure that people have received critical notifications, and escalates if receipt has not been acknowledged within a certain period of time.

Federated Search

In another embodiment, Federated Search applications 122 can be created which query multiple systems and sources directly from a Web browser. Server 124 can be quickly configured to execute queries against multiple disparate information sources. The results of these queries are returned in a personalized format to an end user's Web browser. For instance, a particular requirement might entail presenting documents from three separate repositories to a user's screen in a consolidated format. One of these repositories might be in Lotus Notes, another a Web Service, and the third a relational database. Server 124 ties to each of these sources transparently, such that when a user presses a button within their browser, they will see a neatly formatted page containing documents from all systems, which can then be sorted using a variety of mechanisms. Also, via a similar Web interface, end users can configure the "look and feel" of the results page, which may include excluding certain results and even adding other data source targets to a query. End users can also specify monitoring and alerting profiles based on specific queries so that they can be notified in real-time should an item of interest appear.

Webified and Unified Applications

In another embodiment, Webified and Unified Applications 122 can be created that make any set of applications unified and Web-accessible. Server 124 can be used to provide an integrated view of inventory, financial assets, or other items that are typically tracked in multiple systems. For a particular company, not all products may be tracked in a single system, while a user may need a listing of the next ten products that will most likely need to be reordered. In this scenario, the present invention enables detailed unified reports to be generated against inventory control systems, databases, and catalogs that would otherwise be totally separate. Without the present invention, the user would need to perform multiple queries, a merge, and then manual analysis to determine if any queried information is actually meaningful to the business decision at hand. In general, using solutions based on server 124, end users can access and manage multiple legacy systems and databases from local or remote locations using only a Web browser. Rather than having to be at a particular terminal, any networked location can be used as access station within network 100.

Real-Time Multi-Source Data Processing

In another embodiment, Real-time Multi-Source Data Processing applications 122 can be created that automatically monitor, capture, filter, and disseminate data from multiple changing data streams. As a multi-source data processing system, server 124 automatically integrates and processes data from multiple disparate information sources, such as LexisNexis, remote databases, search engines, and other Web-based data sources. Server 124 can connect to e-mail, Instant Message networks, and wireless gateways to instantly notify people throughout an organization of important changes or new information. New information or changes captured by server 124 can be stored in internal databases for later search and retrieval, fed through categorization/entity extraction engines, or filtered and updated to a corporate portal or real-time dashboards.

Event Correlation: Enterprise Resource Planning/Project Management

In another embodiment, Event Correlation applications 122 can be created that continually monitor changes or activity in one system that have an effect on activity in another system. In many manufacturing environments, project management systems are separated from the logistics systems that track the delivery of assets that influence project completion. Server 124 provides a powerful mechanism for integrating disparate systems that contain data that continually needs to be correlated. For example, a project manager may specify a task in a project management system. That task might be to build a particular section of an airplane by a certain date. In order for the section of the airplane to be completed on schedule, assets tracked in a totally separate logistics system must be delivered on-time. In many instances, a person may be delegated to correlate events in the logistics system with tasks in the project management system. By placing server 124 on top of both systems, all events are managed automatically. Users can access a single Web browser interface to view events and data that are happening in both systems, without requiring individual logins. Further, if a particular asset will not be delivered on time, server 124 can decide whether to alert a manager or other designated person based on how the expected delivery date affects the overall project.

Smart Data Routing

In another embodiment, Smart Data Routing applications 122 can be created that route any kind of data to user desktops or applications based on pre-defined rules. Server 124 is ideal for routing and re-purposing data streams. For instance, in many organizations that deal with high volumes of information, data typically comes off of large "pipes" that then need to be parceled out to other people and applications that require very specific pieces of information. Instead of having people manually filter information from data collected via a satellite downstream, server 124 dynamically routes data based on pre-defined rules as new information arrives. For example, in an application 122 where images are continually arriving accompanied by metadata descriptions of those images, server 124 parses the appropriate metadata descriptions and then dynamically pushes the images to the appropriate systems or users based on pre-defined metadata filters and preferred delivery channels.

Link Analysis Automation

In another embodiment, Link Analysis Automation applications 122 can be created that improve analytic business processes by automatically extracting data from multiple sources and instantly updating visualization tools. In order to effectively perform link analysis on data from multiple disparate sources, data must typically be retrieved, classified, sorted, and ultimately re-stored in central databases using people-intensive processes. Link analysis (e.g., visualization) then occurs on the data in the central database. Server 124 dramatically improves the efficiency of business processes associated with link analysis by automating the process that moves data from multiple sources into the queues or central databases that drive visualization tools used by analysts. First and foremost, server 124 automates the retrieval/extraction of data from disparate sources. Upon retrieval, server 124 performs "first blush" parsing and filtering against these data sets. Server 124 can then feed these data sets through 3rd party natural language or entity and event extraction engines to determine how to classify and display key items within visualization tools. If a third party engine is not available, server 124 can ask the user in a Web-browser window to classify the data/document using interactive dialogs.

Workflow Initiation

In another embodiment, Workflow Initiation applications 122 can be created that rapidly integrate workflow systems with enterprise-wide data sources and applications. Such applications 122 are able to detect data events/changes in disparate enterprise systems and automatically activate workflow processes based on those events, as well as be activated by workflow systems themselves. Additionally, such applications can send notifications to users (e.g., via IM, e-mail, etc.)

based on data events/changes in those systems and data sources. Recipients of such notifications can click links to execute pre-defined cross-system responses that interact with core workflow processes.

Content Management

In another embodiment, Content Management applications 122 can be created that fuse data from multiple sources and re-present on a near real-time basis. Server 124 can be rapidly configured to bring together data from multiple information sources and present it in a variety of formats, including Hypertext Markup Language (HTML) and XML. Server 124 can also monitor individual information sources themselves for changes, problems, and other information on a near real-time or interval basis. At the same time an application 122 is fusing data for presentation, that application can also be processing the data for particular events. After any kind of data event is detected, applications 122 can update search engines or knowledge management tools, send notifications via collaborative software, or even update a visualization tool. Individual applications 122 can be rapidly customized in XBOML based on specific processing requirements for each source. User delivery preferences along with parsing rules can be rapidly configured in a dynamic Web interface.

Financial Services

In another embodiment, Financial Services applications 122 can be created that connect legacy back-end systems (e.g., savings accounts) with customer-facing front-end systems (e.g., marketing) to deliver customers relevant and actionable data. Server 124 rapidly integrates events from back-end legacy banking systems with newer front-end CRM systems. For example, server 124 can be configured to listen to specific fluctuations in priority customer accounts. If monies in excess of a certain threshold are being transferred out of a particular savings account over a particular period of time, server 124 connects to a CRM system and populates a "follow-up" queue. When an account advisor opens their CRM application, they will see a ticket already started indicating that they need to make an immediate call to notify the customer of this problem. Furthermore, depending on the architecture of the CRM system, the account representative may be able to query other back-end customer data without ever needing to leave the CRM system or even knowing how to access the other legacy financial systems.

Bioinformatics and Life Sciences

In another embodiment, Bioinformatics and Life Sciences applications 122 can be created that provide near real-time business intelligence on bioinformatics processes. Compound discovery managers often need to be able to manage their portfolios by benchmarking compounds against internal and external knowledge on a real-time basis. Server 124 applications can be configured to watch and respond to additions to internal and external databases. Additions or correlations can generate automatic notifications based on compound results or generate data flows to dashboard windows that highlight compounds that pass testing criteria. Furthermore, development managers often want to track and integrate data on manufacturing, pre-clinical, clinical, regulatory disciplines, and benchmarks against internal knowledge on a real-time basis. Server 124 applications can be easily configured to detect serious/related/unexpected clinical events and then execute pre-defined actions based on dynamic rules sets. For instance, server 124 may initialize an Instant Messaging chat with a manager if a particular study site is more than twenty-five percent behind an enrollment goal or fifteen percent over budget, as well as provide continual dashboard updates based on those figures.

Logistics

In another embodiment, Logistics applications 122 can be created that monitor and instantly react to events across the supply chain. Server 124 rapidly integrates and provides event notification (actionable alerts) based on multiple SCM data sources. For instance, if inventory levels drop below certain thresholds in three disparate systems, server 124 can provide intelligent notifications that would otherwise not be relevant had an event occurred on only one of three systems. Furthermore, if an inventory level drops below a certain threshold in one system, while another system indicates overstock, server 124 automatically detects such inefficiencies and performs automatic adjustments to allocations. Server 124 can also be configured to perform automatic surveys of personnel responsible for inventory systems in disparate warehouses. For instance, if a particular warehouse is low on a particular SKU, a user can click a link in a Web browser window that opens Instant Messaging windows to personnel in partner warehouses. These personnel are asked by the applications to provide specific SKU availability information in their IM windows and then press "Send." The application 122 that initiated all Instant Messaging requests then gathers all responses and provides the initiating user with the closest warehouse that can provide additional inventory.

Password Provisioning

In another embodiment, Password Provisioning applications 122 can be created that manage passwords across large organizations. In large organizations with multiple systems, applications can simultaneously interact with password facilities across numerous applications in order to expedite password provisioning. Using server 124, solutions can be deployed to allow users or network administrators to enter account information once and have applications 122 create accounts across multiple systems. Applications 122 can also perform cross-system queries of security facilities to determine access violations and security breaches.

Network Asset Management

In another embodiment, Network Asset Management applications 122 can be created that create event-aware software management processes. Many computer security breaches can easily be prevented if organizations continually monitor information in Internet security intelligence sources and vulnerability databases. For example, often there are serious vulnerabilities in various Web server products which are reported in various security resources on the Web. If organizations are made aware of such vulnerable software applications installed on their computers, they would avoid spending countless dollars to repair infected systems, as well as prevented operational slowdowns also resulting in financial loss. To rectify this "event correlation issue," server 124 can perform automated correlation of software inventories or network events against vulnerability databases such as Xforce, CERT, or BugTraq. Server 124 can rapidly integrate with existing software inventory and license compliance packages, as well as with complex Internet (HTTP/HTTPS) sources, XML sources, TCP/IP streams, and databases. As soon as a vulnerability matching an installed application is published on a security resource, the appropriate people will be notified and preventative responses can be executed instantly.

Network Event Detection

In another embodiment, Network Event Detection applications 122 can be created that simultaneously process events (e.g., intrusions or port scans) from multiple devices and existing management systems from around an organization's network. Server 124 can be rapidly deployed to detect and correlate security events from devices, applications, and data sources across large networks. Server 124 integrates with sources beyond firewall/IDS as well as listens to events from cellular switches, Tivoli, WebSphere MQ, Telnet, other Enterprise Management Systems or Operational Support Systems and SNMP traps. Server 124 can be configured as a central server, or in a "Web" architecture where each deployment sits next to the data source in question and communicates to a central server via HTTPS for final processing of all streams. Server 124 can then automatically respond to aggregated network events, such as via SNMP or by issuing notifications.

Archiving and Storage

In another embodiment, Archiving and Storage applications 122 can be created that create a unified view of storage events across the enterprise. Server 124 can be configured to detect, aggregate, and respond to cross-system storage events, regardless of the storage system. Responses may include providing actionable notifications that, when clicked by administrators, result in reconfiguration or error correction. Furthermore, applications 122 may automatically respond to storage events by performing data transformation, analysis, or duplication/backup.

IX. Performance Metrics

Below are performance metrics examples to illustrate the processing efficiency of XBOML-written applications 122 executing on AIEP server 124. The following metrics were taken on a workstation equipped with a single Intel® Pentium® 2.4 Ghz processor with 512 MB of RAM, executing the Microsoft® Windows® XP operating system with a 40 GB hard drive.

As will be appreciated by those skilled in the relevant art(s), implementing alternate embodiments shown in FIGS. 1B-E, as well as adding more RAM and CPU power, performance can be increased considerably. In fact, doubling or quadrupling the number of server 124 instances and physical machines for a specific application 122 can result in a near doubling or quadrupling of performance. These performance increases are specifically tied to server 124 and do not account for network traffic associated with accessing data sources.

Adding additional processors and RAM to specific physical servers running server 124 can also result in significant performance increases, but it has been observed that the increase per added processor will not always be linear. Linear performance increases based on added processors occur with server 124 applications that have high volumes of internal data processing (e.g., parsing, event processing and the like) relative to external 110. Further, many applications 122 are dependent on network traffic, and thus these metrics have been taken based on minimal time required to access and retrieve data from particular sources.

Federated Query

Scenario:

User initiates HTTP request to server 124, which then queries multiple data sources and returns results to the user's Web page.

Performance Statistics:

Including network traffic, server 124 simultaneously queried two network 100 databases (using JDBC) for 5K documents and returned 22 requests per second or 1,320 requests per minute. If a hundred users simultaneously submitted a query request to server 124, they would each wait a maximum of five seconds for a response. Depending on the network traffic associated with accessing each underlying data source, processing time per request will increase. For databases and similar types of sources, this increase is typically minimal. In a distributed approach leveraging multiple servers 124 of the same configuration, each additional server 124 instance would result in a doubling of processing capacity, as multiple servers 124 would simultaneously and independently handle service requests. For the two database query applications above, a four node distributed system (i.e., four individual physical server machines) would return 5,280 requests per minute, or 88 requests per second. If three hundred users simultaneously submitted a request, they would each wait a maximum of 3.5 seconds for a response.

Alerting and Profiling

Scenario:

Server 124 is automatically reviewing text documents arriving from multiple destinations. Based on keyword profiles, users are alerted to documents matching their areas of interest. Server 124 is continually retrieving 20K documents; a hundred users are active within server 124, each with a profile containing twenty keywords; Users are alerted via e-mail when any/all keywords match their profiles; Profiles are dynamically modifiable via Web interfaces; and assumes e-mail alert is sent to a user on one out of every ten documents.

Performance Statistics:

Server 124 processes at least seven hundred 20K text documents per hour, or approximately 16,800 documents per day on behalf of a hundred users. Because the majority of processing is not I/O related, additional hardware added to a particular configuration will result in substantial performance increases. A similar single-machine, four-processor server 124 implementation would handle up to approximately 67,200 documents per day on behalf of four hundred users or 16,800 documents per day on behalf of 1,600 users. In a distributed approach leveraging multiple servers 124 of the same configuration, an additional server 124 instance would result in a doubling of server 124 processing capacity, as each server 124 would be responsible for processing different sets of user profiles.

Document Ingest

Scenario:

Server 124 is receiving 20K documents via multiple destinations. Each document, as it arrives, is processed through a categorization engine, written to a local file system, and stored in a relational database. This process also includes the parsing of metadata returned by the categorization engine, as well as other complex conditional logic.

Performance Statistics:

Based on the hardware and software configuration specified above, and excluding network traffic and external categorization processing time, server 124 processes at least five documents per second or three hundred documents per minute. In a distributed approach leveraging multiple servers 124 of the same configuration, each additional server 124 instance would result in a linear increase of processing capacity, as multiple servers 124 would simultaneously and independently handle document ingest processing.

Data Brokering and Information Sharing

Scenario:

External information sources are continually posting 20K messages to server 124. Server 124 automatically and simultaneously posts the incoming messages to three remote servers via HTTP.

Performance Statistics:

Based on the hardware and software configuration specified above, Server 124 receives and disseminates at least six 20K messages per second, or 360 messages per minute.

X. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A system, comprising:
an application integration and event processing [AIEP] server including at least one processor in communication with a network, the AIEP server adapted to process event information from a combination of sources on the network to generate at least one integrated application;
a source markup language template specifying the locations of the combination of sources that will be accessed during execution of the integrated application; and
at least one of:
an object markup language template specifying the parsing, organizing and typing of data received from the combination of sources; and
an alert markup language template specifying a processing instruction for data received from the combination of sources,
wherein each markup language template enables use of data and functionality of the combination of sources without merging the sources.

2. The system of claim 1, wherein the at least one of an object markup language template and an alert markup language template comprises the alert markup language template.

3. The system of claim 1, wherein the at least one of an object markup language template and an alert markup language template comprises the object markup language template.

4. The system of claim 1, further comprising another server for integrating applications from the network to process event information from across the network, wherein at least one of the at least two markup language templates is shared between the servers.

5. The system of claim 1, further comprising another server for integrating applications from the network to process event information from across the network with at least one integrated application, wherein the servers share an integrated application.

6. The system of claim 1, further comprising an interface for accessing the templates of the at least one integrated application to change the at least one integrated application.

7. The system of claim 6, wherein access to the templates is limited to only those templates having a specified grouping name.

8. The system of claim 1, further comprising an interface with the AIEP server for another user to access the templates of the at least one integrated application to change the at least one integrated application into a modified integrated application.

9. The system of claim 1, wherein the alert markup language template defines one or more linear processing steps including at least one selected from a group consisting of SWITCH and CASE.

10. The system of claim 1, wherein the alert markup language template defines one or more linear processing steps including IF-THEN-ELSE statements.

11. A method for providing data event processing and application integration within a network, comprising:
automatically integrating at least one of a plurality of applications on the network by processing event information from the applications to generate at least one integrated application;
a source markup language template specifying the locations of the plurality of applications that will be accessed during execution of the integrated application; and
at least one of:
an object markup language template specifying the parsing, organizing and typing of data received from the plurality of applications, and
an alert markup language template specifying a processing instruction for data received from the plurality of applications;
wherein each markup language template enables use of data and functionality of the applications without merging the applications.

12. The method of claim 11, wherein the at least one of an object markup language template and an alert markup language template comprises the alert markup language template.

13. The method of claim 11, wherein the at least one of an object markup language template and an alert markup language template comprises the object markup language template.

14. The method of claim 11, further comprising another server for integrating applications from the network to process event information from across the network, wherein at least one of the at least two markup language templates is shared between the servers.

15. The method of claim 11, further comprising another server for integrating applications from the network to process event information from across the network with at least one integrated application, wherein the servers share an integrated application.

16. The method of claim 11, further comprising an interface for accessing the templates of the at least one integrated application to change the at least one integrated application.

17. The method of claim 16, wherein access to the templates is limited to only those templates having a specified grouping name.

18. The method for providing data event processing and application integration within a network of claim 11, further comprising:
providing an interface with the AIEP server for another user to access the templates of the at least one integrated application as defined by a first user to change the at least one integrated application into a modified integrated application.

19. The method of claim 18, further comprising the first user accessing the templates of the at least one integrated application to change the at least one integrated application into a modified integrated application.

20. The method of claim 11, wherein the alert markup language template defines one or more linear processing steps including at least one selected from a group consisting of SWITCH and CASE.

21. The method of claim 11, wherein the alert markup language template defines one or more linear processing steps including IF-THEN-ELSE statements.

22. The method of claim 11 wherein the event information from the applications has a plurality of formats.

23. A system for providing data event processing and application integration within a network, comprising:
a plurality of application integration and event processing [AIEP] servers adapted to integrate applications from the network to generate at least one integrated application, each AIEP server including at least one processor in communication with the network, the integrated application adapted for processing event information from across the network;

a source markup language template specifying the locations of a combination of sources that will be accessed during execution of the integrated application;

at least one of:
  an object markup language template specifying the parsing, organizing and typing of data received from the combination of sources, and
  an alert markup language template specifying a processing instruction for data received from the combination of sources;

wherein each template enables use of data and functionality of the combination of sources on the network without merging the sources; and user profiles shared between the plurality of servers for maintaining access information to the templates.

24. The system of claim 23, further comprising an interface with the plurality of servers to access the templates of the at least one integrated application to change the at least one integrated application into a modified integrated application, wherein access to the templates is limited to only those templates having a specified grouping name.

25. The system of claim 1 wherein the event information from the combination of sources has a plurality of formats.

26. The system of claim 23, wherein the alert markup language template defines one or more linear processing steps including at least one selected from a group consisting of SWITCH and CASE.

27. The system of claim 23, wherein the alert markup language template defines one or more linear processing steps including IF-THEN-ELSE statements.

28. The system of claim 23 wherein the event information comprises a plurality of formats.

* * * * *